UNITED STATES PATENT OFFICE.

ALBERT RIEDER, OF ALLEGHENY, PENNSYLVANIA, ASSIGNOR TO HIMSELF, MICHAEL HELBLING, AND SAMUEL S. McKENNEY, OF SAME PLACE.

IMPROVEMENT IN COMPOUNDS FOR LINING OIL-BARRELS.

Specification forming part of Letters Patent No. 167,569, dated September 7, 1875; application filed July 10, 1875.

*To all whom it may concern:*

Be it known that I, ALBERT RIEDER, of Allegheny, in the county of Allegheny and State of Pennsylvania, have invented a new and useful Improvement in Composition for Oil-Barrels; and I do hereby declare the following to be a full, clear, and exact description thereof.

My invention relates to that class of compounds employed for lining oil-barrels used in the transportation or storage of hydrocarbon and other oils; and it consists in a composition of rosin, glue, caustic soda, and sal-soda as the principal ingredients, to which others may be added without departing from the spirit of my invention, which is based upon the known action of caustic soda upon gelatine glue, and of sal-soda upon rosin.

The object of this invention is to provide a composition for lining oil-barrels, which, while pliable and flexible at ordinary temperatures, will retain its form and consistency at any temperature to which it is liable to be subjected—say, for instance, the temperature at which hydrocarbon-oil is run from the still.

I will now proceed to describe my invention so that others may make and use the same.

I take the ingredients in or about the following proportions: of water, one quart, (1 qt.;) rosin, two pounds, (2 lbs.;) glue, one pound, (1 lb.;) caustic soda, one ounce, (1 oz.;) sal-soda, two ounces, (2 oz.;) boiling and agitating them thoroughly until a complete solution and admixture of the ingredients takes place, and a homogeneous mass is obtained. The compound thus made can be used at once and applied to oil-barrels or similar articles in the usual manner, or it may be allowed to cool for storage and sale, and be afterward brought to the desired consistency by the heat and the addition of water when desired for use.

Glue and rosin would of themselves make a compound too brittle for the purpose intended, and liable to crack and peel under the rough usage given to oil-barrels in transportation and handling; but by the addition of caustic soda the glue is modified, and by the further addition of sal-soda the solution of the rosin is aided, so that a flexible compound well suited for lining oil-barrels is obtained.

Having thus described my invention, I claim—

A compound containing rosin, glue, caustic soda, and sal-soda, substantially as and for the purposes specified.

In testimony whereof I, the said ALBERT RIEDER, have hereunto set my hand.

ALBERT RIEDER.

Witnesses:
W. N. PAXTON,
JAMES I. KAY.